May 17, 1932.  J. G. COUTANT  1,858,451
PULVERIZED FUEL COMBUSTION
Filed March 17, 1927   3 Sheets-Sheet 3

INVENTOR
Jay Gould Coutant
BY
Rogers, Kennedy & Campbell
ATTORNEYS.

Patented May 17, 1932

1,858,451

UNITED STATES PATENT OFFICE

JAY GOULD COUTANT, OF NEW YORK, N. Y., ASSIGNOR TO FURNACE ENGINEERING COMPANY, INC., OF NEW YORK, N. Y., A CORPORATION OF NEW YORK

PULVERIZED FUEL COMBUSTION

Application filed March 17, 1927. Serial No. 176,137.

This invention relates to pulverized fuel combustion and has reference to the apparatus or furnace for carrying out the same. The chief feature of utility of the present invention is in the firing of various furnaces, such as boiler furnaces, and as herein described the invention is primarily designed for the control of the temperatures in a furnace burning pulverized coal, although in connection with certain features hereof equivalent fluent fuel could in some cases be substituted.

General objects of the present invention include: To improve efficiency in firing furnaces with pulverized fuel, while increasing convenience of operation and control, prolonging the life of the furnace, and minimizing the upkeep cost; also to afford such control over the combustion as practically to eliminate or minimize certain drawbacks existing in methods in furnaces heretofore known. Further and more specific objects and advantages of the present invention will be pointed out in the hereinafter following description of several embodiments therefor, or will be understood to those skilled in the subject matter of combustion.

The present application constitutes a partial continuation as to certain features disclosed in each of two prior applications filed respectively March 5, 1925, Serial No. 13,322 and October 5, 1925, Serial No. 60,435, both relating to pulverized fuel combustion, each showing several embodiments of the invention therein disclosed, certain of which embodiments are included herein as parts of the present application, as will be hereinbelow further referred to. Said application 13,322 has now been patented, February 26, 1929, No. 1,703,814. The invention hereof consists in the novel features of apparatus, combination, arrangement, operation and construction herein illustrated or described except so far as claimed in the prior applications.

In the accompanying drawings Fig. 1 is a vertical section, partly in the nature of a diagram, of a water tube boiler and furnace embodying the principles of the present invention, this figure corresponding substantially with Fig. 3 of said prior application No. 60,435; and Fig. 1ª is a skeleton front elevation of certain pipes and headers, while

It is to be understood that throughout the drawings many details and connections are shown diagrammatically, without attempt to conform accurately to practical embodiments, as furnace engineers will well understand the principles and how to apply them.

Referring first to the embodiment of Figs. 1 and 2 this shows a combustion chamber 10 laterally surrounded by a front wall 11, rear wall 12, and side walls 13, while at the upper front is shown an arch 14; the chamber bottom will be subsequently described in greater detail. The boiler is shown as of the type composed of water tubes 15, and it may be of any well known type. In using the term water at this point and hereinafter it is intended to include water either in liquid form or as steam, unless water in liquid form is specifically prescribed. The present invention may be applied to a boiler furnace or steam generator of substantially any type, fire tube, water tube or other type, whether for stationary, locomotive or marine use.

For purposes of illustration a boiler of the cross drum type is shown in the drawings, the drum 16 being shown above the boiler; and the boiler being provided with first and second baffles or walls 17 and 18 compelling the products of combustion to travel a tortous path to the final outlet and stack. In front of the first baffle 17 and below the second baffle 18 is indicated an ash space or pocket wherein may accumulate the finer solid particle or ashes of combustion, or a portion of them, which tend to ascend from the combustion chamber through the boiler; and hereinbelow will be described a means of removing the ashes accumulating in the space 19 and utilizing them.

The lower end of the combustion chamber is provided with a special form of furnace bottom embodying the principle of my novel water bottom or floor made the subject of claim in my said Patent 1,703,814. The bottom is preferably inclined as in said prior application, but in the present embodiment the bottom or floor is formed in separate inclined floor portions 21 and 22, at the front and rear respectively, with a gap or passage 23 between their lower ends constituting an opening or chute extending preferably the entire width of the boiler and serving to discharge ashes downwardly into the closed or sealed ash chamber or pocket to be described.

Since the illustrated front and rear floor portions 21 and 22 are shown of somewhat different arrangement and use, the front floor portion 21 will be described first, although manifestly the two floor or bottom portions cooperate in that they mutually converge, giving a hopper shape bottom, discharging centrally through the opening or chute 23, and both floor portions being water cooled. The front floor portion 21 embodies water tubes 25. These are circulation tubes preferably in circulation with the boiler, and are shown extending across the floor in such a manner that each tube is inclined. The tubes are preferably closely spaced across the entire width of the boiler, and their upper ends may be united by an exterior header 26. Steam or hot water generated in the floor 21 will thus ascend to the header 26, from which is shown a pipe 27 leading upwardly and constituting the lower header for a series of tubes 28 constituting a water wall in the upper part of the combustion chamber. These wall tubes 28 are in turn connected by a top header 29 which is shown connected by a pipe 30 with a suitable part of the steam space of the boiler such as the rear or upper boiler header, from which the generated steam travels by the usual passages into the drum 16. The supply or downward flow of the water to the water floor 21 is shown effected by a pipe 31 leading from the drum to a lower header 32 connecting the floor tubes 25, or rather the downward tube extensions 33 extending into the ash chamber for purposes to be described.

In accordance with my Patent 1,703,814 the floor tubes 25 are directly exposed to the radiant heat of combustion. This does not imply that the actual tubes are bare, but that the arrangement is such that the floor affords high heat conducting power from the combustion space to the water circulating in the tubes. A heat conducting cover 35 is indicated overlying the tubes, and this is preferable, not only as protecting the tubes from direct injury, but affording a smooth or flat upper surface, better adapted for the clearing, removing or shedding of ashes and other solid matters falling or settling upon the floor. The overlying cover 35 may be composed of cast iron plates or strips, preferably shaped underneath to the contour of the tubes, so as to insure a high rate of heat conduction, the floor thus absorbing large amounts of radiant heat from the combustion space, this absorbed heat being taken up by the circulating water, which thus keeps the floor sufficiently cool to prevent destruction, while adding materially to the evaporation of the boiler, the extraction of radiant heat from the combustion space at the same time operating to take down the temperature within the furnace, meaning both the general or mean temperature and the existing temperature in the hottest or combustion zone, thus in turn permitting the furnace and boiler to be operated at greatly increased rating without production of excessive temperatures and the consequent difficulties in respect to slagging and otherwise.

It is sometimes desirable to provide for the delivery opening or chute 23 a control device such as the gate 37. This may be maintained constantly open, but adjustable in position to regulate the discharge of ash. On the other hand it may be intermittently closed, to receive ashes, and opened to dump them. When the ash chamber is sealed the gate may be entirely omitted. A connection 38 is shown from the gate to a motor 39 which may consist simply of a steam piston and cylinder, controlled by a valve 40.

The ash chamber 42 is below or lower than the discharge opening 23 so as to receive ashes by gravity. The chamber is preferably in the form of a sealed pocket or pit affording receiving space to accommodate a substantial quantity of ash discharged from the furnace bottom. The chamber is shown formed between a front wall 43 and rear wall 44 and at its ends the side walls of the furnace. At its lower end the ash chamber or pocket is shown provided with a dumping device or ash gate 45, which may be operated intermittently at will to discharge the accumulated ashes into any known conveying means, such as a sluice of running water or the vehicle or ash receptacle 46 mounted on wheels running on tracks beneath the furnace.

It will be noted that the ash chamber, while much narrower than the combustion chamber is shown substantially wider than the discharge opening 23. This preferable arrangement not merely increases the capacity of the ash chamber, but affords an arrangement whereby the hot ashes received in the chamber may be substantially protected from being melted and slagged by the radiant heat of the flames, by their removed position or distance from the flames, by the shielding character of the floor structure above, and by the additional expedient of the adjustable gate 37 in the chute 23. The opening 23 is a restricted passage to the enlarged ash chamber, and is itself cooled and protected.

The ash pit hereof is preferably also exteriorly sealed, except during the occasional dumping operations, so that inflow of air through the chamber and floor opening is not maintained, and thus permitting the floor opening or chute to be maintained continuously open, the furnace floor thus functioning in the combustion, as already described, while arranged to discharge ashes downwardly into the enlarged ash chamber, whence they are disposed of intermittently or continuously. An advantageous arrangement is the location of the ash chamber 42 at an inside position, that is not in front of or behind the furnace, but beneath the furnace floor and between the wall lines of the furnace. The ash pit, and the chute leading down into it, may both extend the entire width of the furnace, constituting a very effective ash disposal system without impairing the functioning of the water floor.

Among the permissible variations is the provision of a water trough or sluice beneath the ash chamber instead of the intermittent dumping floor 45 discharging into a wheeled car 46. Thus Fig. 3 shows the bottom of the ash chamber 42$^b$ formed into a vessel or sluice 48 in which is shown a body of water 49, which may be still water, drawn off occasionally, or may be running water passing under a water seal wall for progressively removing ashes while excluding inflow of air. Besides cooling the ashes a function is performed by the provision of water in the ash chamber, namely the formation of steam, which passes back through the chute 23 into the combustion chamber, operating as an inert gas or vapor to dilute the combustion gases and thus assist keeping down the temperature of the furnace during periods of high rates of combustion and service. A similar result may be obtained in the Fig. 1 embodiment by means of a water spray 50 located above the ashes in the chamber 42. Regulation of the spraying action will regulate the quantity of steam delivered into the combustion space. Regulation may further be effected by adjusting the position of the ash gate 37, since the wider open this gate is maintained the greater will be the amount of radiant heat entering the ash chamber and therefore the greater the rate of evaporation therein.

Another feature, in connection with the ash chamber, is the cooling of the ashes therein by water tubes carried into the chamber. In Fig. 1 this refers to the downward extensions 33 of the floor tubes 25, also portions of the opposite tubes where extended down below the floor. In either case the tubes may be carried down further into the ash chamber, to increase the cooling effect, on the same principle. These circulation tubes, lining the floor opening 23 and a portion of the ash chamber are adapted to absorb quantities of radiant heat and thus effect cooling operations which will serve to prevent slagging at these points.

An improved feature in respect to the ash chamber hereof is the illustrated subdividing of the chamber lengthwise into sections or subchambers, thus eliminating the difficulties of maintaining a single chamber the full width of the furnace and avoiding the difficulties of dumping therefrom. Thus passing to Fig. 2, a shape of chamber is indicated consisting of a series of small ash chambers 42$^a$, formed by dividing the full length of the chamber by means of inclined walls or ash bridges 52, the apexes of which are substantially below the entrance into the floor opening 23, as indicated by the apex line 53 in Fig. 1. With this arrangement we have substantially converted the elongated chamber into a series of small ash hoppers 42$^a$, and this enables the use of a number of small separate discharge gates 45 at the bottoms of the respective hoppers, and each gate may be provided with a power device or piston 54 for opening and closing the gate at will or automatically. The ash bridges 52 may be constructed of refractory material, without cooling means, since each bridge is protected not only by its removed position from the heat of the flames, but by the proximity of the cooling water tubes 33 extended through the ash chute into the ash chamber, in consequence of which the bridges will not be subject to injury from the radiant heat, and the descending ashes will not be liable to melt or slag upon the bridges or in the chambers.

Figures 1, 1A:
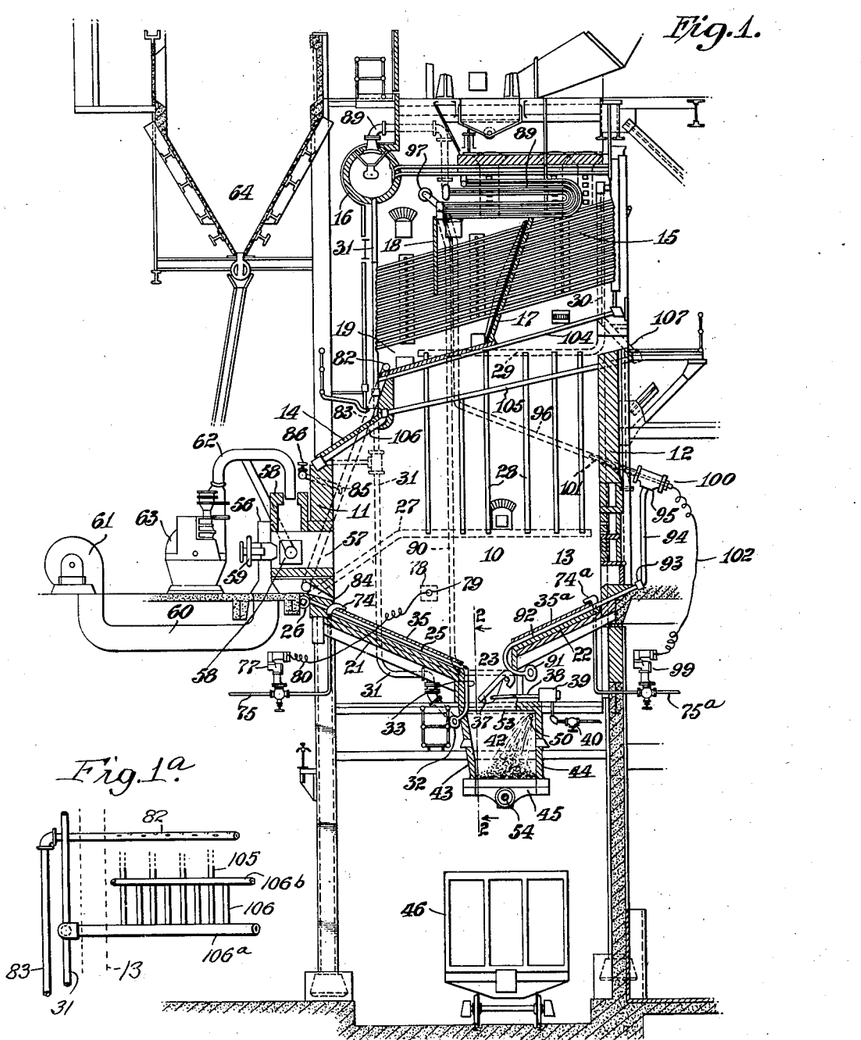
Figures 2, 3:
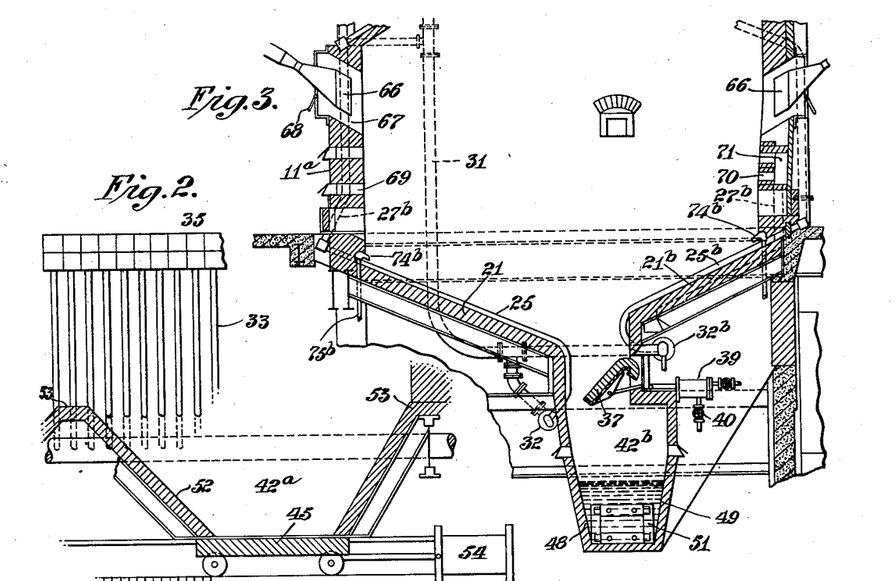
Fig. 2 is a detail vertical section taken substantially on the line 2—2 of Fig. 1.
Fig. 3 is a view similar to Fig. 1, but showing a different embodiment of the invention, and corresponding substantially with Fig. 4 of my said Patent 1,703,814.

When the vessel 48 in Fig. 3 is used as a trough an endless-chain drag device 51 may be used for clearing the ash sludge longitudinally from the vessel. In this figure the floor tubes 25 and 25$^b$ are shown bare, but they may be covered with heat absorbing and conducting material as with Figs. 1 and 2, or the bare tubes may be flattened or square to afford a substantially flat or smooth heat absorbing surface facing the flames.

For introducing fluent or pulverized fuel or coal into the furnace injecting devices of various sorts may be employed. In Fig. 1 is indicated a fuel burner 56 of advantageous character. This comprises a refractory enclosure containing a mixing and combustion space 57. The pulverized coal, mixed with air, may be admitted by a plurality of transverse inlets 58 converging upon an axial point within the chamber, while supplemental air of combustion may be admitted axially by an adjustable air valve device 59 supplied through air passages 60 from a blower 61. The fuel is supplied through pipes 62 from a pulverizer 63 which in turn may be fed from an overhead coal hopper 64.

This forced draft mixing type of burner gives instantaneous ignition. The combustion air and the fuel meet at right angles, with preliminary combustion, and are thereafter mixed and burned in the confined space 57 surrounded by brick walls, from which space it discharges into the main combustion chamber 10. It will be understood that a series of burners may be arranged across one of the walls of the combustion chamber. The flames enter the main chamber forming a hot zone and thus pass upwardly through the cooled part of the chamber and thence into the passes of the boiler. The combustion is partially effected in the confined chamber of the burner, and is instantaneously completed as it expands into a sort of flameless combustion in the main chamber. Such a burner is preferably used horizontally, as shown, and is advantageous for large boiler furnaces, since it permits practically unlimited rates of combustion, due to the brick surrounded initial restricted combustion space. The described combustion operation embodies one of the features covered in prior application No. 60,435, the combustion existing first in a high-temperature zone, in the hottest part of the chamber and furthest removed from the boiler, thence passing into a following or temperature reducing zone and from there into the boiler. It will be observed that the lower part of the combustion chamber 10 is surrounded only by refractory walls, thus promoting and preserving a very high temperature and insuring complete combustion. The next higher or following zone is a cooled zone due to the circulation tubes 28, and in passing through this zone the gases have their temperature lowered substantially, so that before reaching the boiler the temperature is below the melting point of ash, preventing slagging of ash upon the boiler. Water screens may be interposed in the upgoing gases, as will be later referred to.

In lieu of the burners 56 shown in Fig. 1 may be employed ordinary burners comprising nozzles 66 as shown in Fig. 3. A series of these is indicated across the front of the furnace and a corresponding series across the rear. Each of the burner nozzles 66 is shown surrounded by a supplemental air space 67 controlled by a damper 68. In any embodiment additional air may be admitted, as through wall openings 69, and Fig. 2 shows also further openings 70 bring into the chamber preheated air from wall passages 71.

Herein is shown another feature covered broadly in said Patent No. 1,703,814 consisting in the regulation of the temperature of the furnace or combustion zone by varying the heat absorbing surface exposed to the flames. This particularly refers to the water bottom as constituting in effect a portion of the boiler directly exposed to the radiant heat. By adjusting the extent of exposure thereof the regulation of the entire combustion operation is permitted. Thus in periods of high service the entire water bottom can be maintained exposed to the flames thus absorbing much radiant heat and increasing the effective direct exposed surface of the boiler. This permits a greatly enlarged fuel combustion rate without producing excessive temperatures in the combustion chamber, the greater rate of fuel combustion in turn producing a proportionate increase in evaporation, not only at the direct exposed water surfaces, but throughout the boiler. As in the prior application, this is shown herein effected by allowing the water bottom or floor to become shielded by accumulating ashes, in times of normal or subnormal rating or operation, while clearing off the ashes so as to expose the floor, either more thoroughly or more frequently, during times of high service; this operation being available in those embodiments where the bottom slope is relatively gentle and not so steep as to be self discharging. Apart from the regulation, either form of bottom serves the function of absorbing radiant heat, permitting increased rates of combustion, and producing increased evaporation.

As a means of clearing ashes from the floor there are shown jets or nozzles 74 at the front floor portion 21 in Fig. 1, and 74$^a$ at the rear floor portion 22, these jets being arranged at the slopes and directed in a manner to impinge on the layer of fine ashes, so as to drive them downwardly toward the chute 23 and ash chamber. As in the prior application, these jets may be supplied with steam through pipes 75 and 75$^a$, steam constituting an effective ash clearing medium; a special feature of improvement hereof however being the use of liquid water supplied through the jet pipes, as it is found that forcible jets of water expanding into steam afford a more effective clearing action than steam or gas. It will be understood that the illustrated jets 74 and 74$^a$ represent an entire series thereof extending across the furnace. The jets may be hand regulated by ordinary valves, which may be turned on and off as needed, either to give intermittent action, or continuous action of adjustable force. Fig. 3 shows jets 74$^b$ at both sides, supplied through steam or water pipes 75$^b$ controllable either by hand or automatically.

An important feature hereof is the automatic regulation of the furnace, not by regulation of feed of fuel or air, or of the combustion, but rather by controlling the effects following combustion, that is, controlling the resulting temperature of the furnace, or of the hot zone thereof and the products of combustion therein. This can be done in various ways, for example by dilution of the products of combustion for cooling purposes, or cooling the temperatures of the products of combustion in any other manner, for example through the described water floor adapted to accumulate a shield of ashes, and the described jets to clear them off. Thus in Fig. 1 at the front side of the furnace, is shown, interposed in the jet pipe 75 a temperature controlled valve 77. Such a valve is known on the market and may be for example of the Bristol type. It is operated by thermostat control to regulate the flow of steam or water through the pipe, but I am unaware that such a valve has been used for any purpose analogous to that herein disclosed. In addition to the valve the control comprises a pyrometer or thermostat device 78, which may include an elongated thermo-couple 79 extended directly into the hottest zone of the combustion chamber, with electric connections 80 to the motor portion of the thermo-valve 77. By this arrangement when the temperature has a tendency to rise too high the thermostat operates through the automatic valve to increase or render more frequent the ash clearing action, thus giving a greater extent of exposure of the water floor, this developing an increased capacity to absorb radiant heat, thus taking down the temperature and affording increased evaporation. The elements may be adjusted for example to maintain a normal combustion temperature in the neighborhood of 1200° C. If the temperature in the hot zone should rise substantially to 1300° C. this would have a tendency to produce slagging difficulties, and the thermo control would operate to decrease the shielding and thus increase the exposure of the supplemental heat absorbing surface or water floor, thus reducing the furnace temperature on the principles already disclosed in the prior application. If on the other hand the hot zone temperature should tend to reduce substantially to 1050° C. the result would be incomplete combustion and loss of combustible passing out with the flue gases, which would be corrected through the thermo control device by shutting down on the jets so as to allow a greater shielding of the floor and thus build up the temperature to the most efficient point.

In conjunction with the described control, whether manual or automatic, a useful feature is the following, disclosed also in said prior application No. 60,435, consisting of means of returning to the combustion chamber, and delivering directly upon the water floor, ashes from any convenient point, for example collected in the ash space 19. Thus it might be important to effect a quick shielding of the floor in connection with the control operations. For this purpose a perforated pipe 82 is shown extending through the lowest point of the ash space 19, this adapted to receive ashes and conduct them by a downwardly extending pipe 83 to an ash injection inlet 84. The drawing out of ashes from the space 19 and forcing them into the combustion chamber may be expedited by an ejector device 85 controlled by exterior valve 86 and creating a downward draft through the ash pipe 83. I do not herein claim the broad conception of recovering ashes from the flues or other points and returning them to the combustion chamber, as I have disclosed and make broad claim thereto in copending application No. 164,824 filed January 31, 1927, but I herein claim the specific embodiment disclosed in Fig. 1 hereof consisting in directing flue ashes or other ashes directly upon a water floor, at its upper side, for the purpose of shielding or expediting the shielding of the floor, by the ashes, from the radiant heat.

Next will be described my improvement in regulable superheating of generated steam. This involves circulation pipes directly exposed to the radiant heat, but susceptible of being more or less shielded to effect regulation of the degree of superheat. For example the water tubes of the water floor hereof, or a part thereof, may be employed, as a superheater for the outgoing steam; and this may deal with steam either directly from the main boiler or from another or ordinary superheater. Fig. 1 shows, above the boiler proper, and in the passage between the first and second passes, an ordinary superheater 88, receiving steam through pipe 89 from the drum 16. There is shown a downwardly extending pipe 90 by which the steam from superheater 88 is conducted to the lower header 91 of the system of floor tubes 92 comprised in the rear floor portion 22, these tubes constituting the superheater hereof, and being interconnected by an upper header 93. both of the headers 91 and 93 being outside of the combustion chamber. From the upper header extends a pipe 94 to a fitting 95 connected with a further upward pipe 96 leading to the final steam outlet 97, and these connecting pipes may obviously be jacketed, or suitably located to preserve the superheated condition of the steam.

In Fig. 1 there has thus been shown a general combination wherein one water floor portion 21 is utilized for general control of combustion and furnace chamber temperature, while another water floor portion 22 is employed for superheating outgoing steam. This forms a particularly useful combination inasmuch as both floor portions operate to absorb radiant heat and increase evaporation, while preventing excessive temperatures and thus permitting high rates of combustion. The rear floor portion has these effects, although not under control of the furnace temperature, while the front floor portion is under control of the furnace temperature and can thus function to effect the desired control. In some cases the entire water floor, and all portions thereof, could be used for combustion control, or in some cases the entire floor could be used for superheating purposes; both uses being considered to be novel, and the combined use of special and novel utility.

It will be understood from the above that the degree of superheat from the outgoing steam is regulable by regulating the shielding or clearing off of the rear floor portion 22 containing the superheating floor tubes 92. Thus the greater the shielding of the rear floor portion the less will be the heat absorption by the steam circulating through the tubes, while the more effective or the more frequent the clearing of the ashes, the greater will be the heat absorption and the heating effect. This regulation may be effected by nozzles 74ª through jets of steam, gas or water upon the metal, silicon carbide, or other conducting covering or plate 35ª, the nozzles being supplied by pipes 75ª which may be regulated by a valve in any desired manner.

The disclosed embodiment affords means of automatic regulation of the degree of superheat, namely, by an arrangement the principles of which are diagrammatically shown in Fig. 1. Thus a motor controlled valve 99 is shown interposed in the pipe 75ª, this being a thermo control valve regulating the flow of steam, gas or water passing through the pipe to the floor clearing jets. A thermostat device 100 is shown comprising an elongated thermo couple 101 extending through the fitting 95 into the upgoing steam pipe 96, these elements connected by an electric cable 102. This thermo control device may be so adjusted that when the temperature of the outgoing steam exceeds the desired temperature the thermostat device will operate to shut down the automatic valve and thus reduce or cut off the floor clearing jets, permitting ashes to accumulate to shield the floor and reduce the amount of radiant heat absorbed in the floor superheater. When the outgoing steam falls below the desired temperature the reverse operation takes place, and the increased absorption of radiant heat tends to restore the desired temperature. This gives an approximate control of superheating which is entirely automatic and will be advantageous in many situations, and can, if desired, be supplemented by manual control.

Another feature shown in Fig. 1 is a slag screen located in advance of the boiler between the hot and reducing zones of the combustion chamber and the outlet to the boiler. This is not to be confused with the lowermost tier of boiler tubes 104, shown spaced somewhat down from the main tubes to permit access for slag removal. The present improvement consists of a series of fairly widely spaced circulation tubes 105 constituting in effect a water screen for the upward traveling gases, ashes and other products of combustion, these widely spaced tubes operating to absorb radiant heat from the products and ashes ascending between them, so as to chill the ashes and minimize or prevent slagging. This slag screen 105 may be combined with a system of water tubes 106 at the underside of the arch 14. The arch tubes may be closely spaced and draw water through header 106ª from the downcomer 31, while the widely spaced water screen tubes 105 take off from the upper header 106ᵇ of the arch tubes, and slant upwardly to the rear of the boiler, where they are connected by a header leading through pipe 107 to the steam spaces of the boiler.

The various features thus referred to in connection with Figs. 1, 2 and 3 possess utility not merely in themselves, but in many cases giving a combined operation with the described water floor, as the several features in many cases mutually cooperate, giving a joint action and improving the efficiency of the apparatus.

Figures 4, 5:
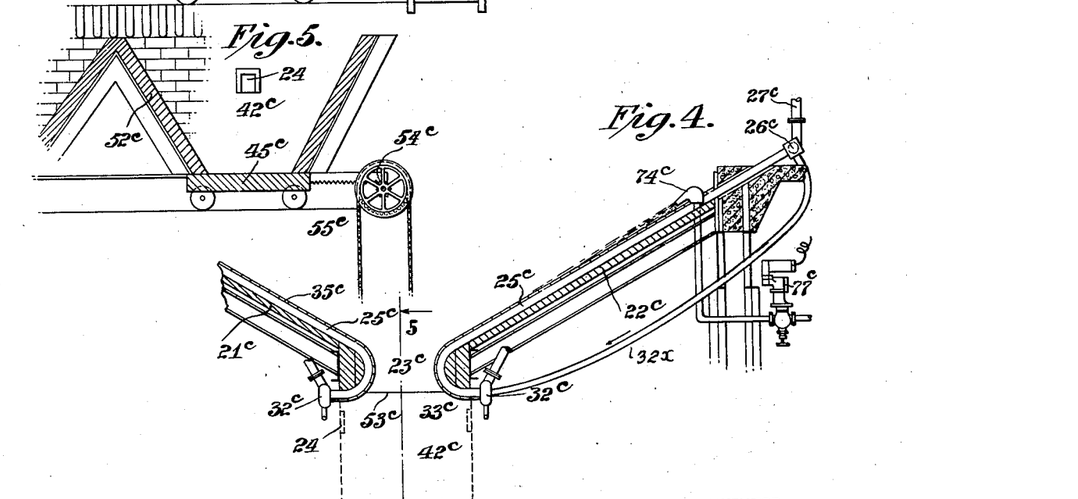
Fig. 4 is a partial vertical section of still another form of embodiment of certain features hereof.
Fig. 5 a section at right angles thereto taken on the line 5—5 of Fig. 4.

Among many possible variations there is one shown in Figs. 4 and 5 wherein the front and rear water floor portions 21ᶜ and 22ᶜ are symmetrically arranged, rather than having the special arrangement shown in Figs. 1 and 3, the chute or floor openings 23ᶜ being continuously open and delivering into the constantly sealed ash pit 42ᶜ. Nozzles 74ᶜ may supply fluid jets controlled by automatic valves 77ᶜ as before. The water tube portions 33ᶜ curving down to the headers 32ᶜ face the floor opening and the ash chamber so as to absorb radiant heat and cool the descending ashes and prevent slagging thereof. The ash chamber 42ᶜ may be subdivided into small hopper shape chambers as shown in Fig. 5 by means of ash bridges 52ᶜ, while the dumping gates 45ᶜ may be intermittently operated by rack and pinion devices 54ᶜ worked automatically or by hand, through sprocket 55ᶜ. The floor and chute tubes 25 and 33 may be covered by iron coverings or blocks 35ᶜ as with the floor in Figs. 1 and 2. A downgoing water connection 32ˣ may be arranged from the upper floor tube headers 26ᵉ to the lower headers 32ᶜ, bringing water back for quick recirculation without passing to the boiler. Ash pit doors 24 may be opened to give access for cleaning the floor portions 21ᶜ and 22ᶜ.

Figures 6, 7:
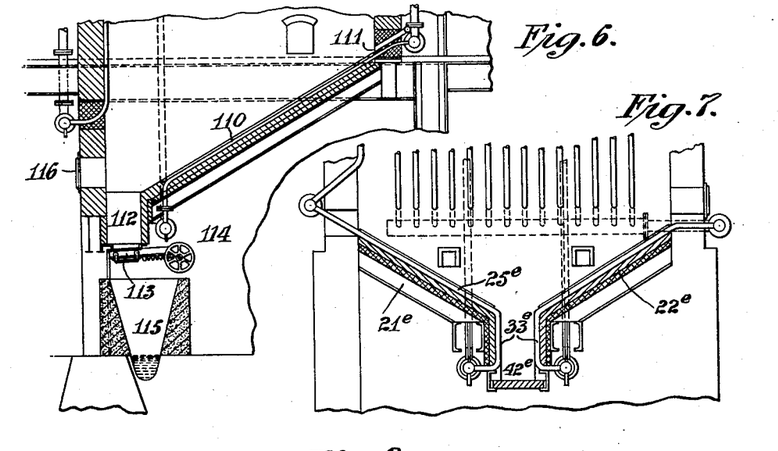
Figs. 6, 7, 8 and 9 are figures generally similar to Figs. 1, 3 and 5 but showing various modified embodiments of the features of invention.

Fig. 6 shows a variation wherein the water floor 110 slopes downwardly from one furnace wall substantially to the other, instead of having the central ash pit. Jets at 111 may be employed for driving the ashes down the inclined floor and the ashes may be received in a sealed ash chamber 112 located inside the furnace wall line and beneath the combustion chamber. As before the ash chamber has a dumping gate 113 at the bottom, with operating mechanism 114, and the gate discharges into a water sluice 115. In this embodiment the ash chamber is at a low point and at one side and thus fairly shielded from the hot zone, so that, as indicated, the floor water tubes do not have to be brought down into the chamber for cooling the ash.

In the Fig. 7 form the front and rear floor portions 21ᵉ and 22ᵉ contain exposed water tubes 25ᵉ which are extended down at 33ᵉ into and substantially to the foot of the ash chamber 42ᵉ; this symmetrical arrangement showing great utility for certain conditions.

Figure 8:
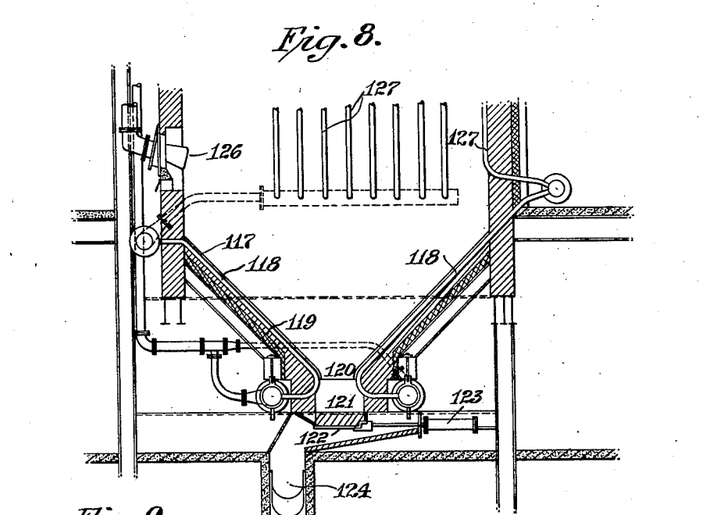

Fig. 8 shows a variation wherein the two sides 118 of the furnace bottom are steep enough to be self discharging by gravity. These surfaces are shown at about 45°, intended to be steeper than the angle of repose. These surfaces are covered with water circulation tubes 119 and these extend down into the chute or opening 120 by which the furnace discharges into the sealed ash pit 121, the water tubes operating to cool the pit and the ashes therein. The bottom of the ash chamber is provided with a dumping gate 122 operated with a mechanism 123 and when dumped the ashes are discharged into a water sluice 124. This figure shows a burner 126 discharging into the hot zone of the combustion chamber and tubes 127 constituting a water wall to the furnace. The ash chamber 121 may be subdivided into smaller chambers by ash bridges as before.

Figure 9:
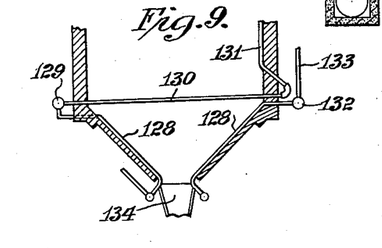

In Fig. 9 is shown an embodiment comprising a useful combination of a water bottom consisting of opposite, hopper shaped water cooled surfaces 128 and a water screen. The water tubes 128 shown at the left side connect with a header 129 and from this header are taken widely spaced circulation tubes 130 extending across the combustion chamber to constitute the water screen as stated. Each tube of the water screen may connect by an individual header with a plurality of upwardly extending tubes 131 constituting a water wall. The bottom tubes 128 at the right side of the figure connect with an exterior header 132 from which a pipe 133 extends to the boiler. The water cooled hopper bottom 128 discharges into a sealed ash pit 134 which may generally follow the description given in connection with the other figures.

In using herein such terms as thermostat or pyrometer in respect to the automatic control of the furnace or of the superheater, it is intended to cover any temperature or heat controlled means or device available for the purpose. The thermo-control means hereof may be considered as including any thermo-motive device, of which the thermo-couple is merely an illustration, adapted to operate a valve or otherwise regulate an operation whether directly or indirectly, or by electric, pneumatic, hydraulic or mechanical connection. It is to be understood that suitable openings or doors in the furnace walls may be provided at proper points to give access to the surfaces of the bottom or floor or ash chamber for cleaning or other purposes. For example a door 24 may be arranged in the ash chamber, through which implements may be inserted for scraping or cleaning the accessible surfaces; while in Fig. 6 doors 116 are shown in a different locality for a similar purpose.

An important feature of control hereof in connection with the jets or nozzles 74 directed upon the bottom or floor hereof is the availability of steam or of liquid water for the jets, or change from one to the other. The use of water in place of steam is particularly useful at peak loads of service. It evaporates into very forcible steam jets for clearing the floor of ashes, thus permitting greater heat absorption and prevention of excessive temperatures; but aside from that, and irrespective of the water floor, the water jets give the result of diluting the combustion gases by steam and thus preventing excessive furnace temperature, while at the same time absorbing the heat necessary to convert the water to steam, and in that way lowering the temperature; so that at times of peak load and combustion rate, by opening up the water jets all the drawbacks of excessive temperature may be obviated; and this operation may be automatic as already described. In using the terms floor and bottom in this patent I intend to draw the distinction that a floor is specifically a bottom which is not inclined too steeply for accumulation of ashes falling upon it.

While the following features are herein disclosed and were disclosed in my said prior Patent 1,703,814 they are not herein claimed, but are made the subject of claim in my co-pending application Serial No. 342,039, filed February 23, 1929, namely, a water cooled arch above the fuel entrance of a furnace, especially a boiler furnace burning pulverized coal; also said arch comprising water circulation tubes preferably with refractory wall members between them; also the refractory members being supported on and depending between the tubes so as to leave the tubes effectively exposed, but preferably partially shielded by the refractory members; also such water cooled arch above the fuel entrance in combination with a water cooled bottom beneath such entrance, with preferably the arch and bottom flaring away from the injected fuel stream; also said water cooled arch in combination with a slag screen of relatively widely spaced water tubes to which the water arch delivers, said screen located between the combustion zone and the boiler.

There have thus been described a new method or system of pulverized fuel combustion and an apparatus or furnace for carrying out the same, embodying the principles and attaining the advantages of the present invention. Since various matters of combination, arrangement, operation, construction and detail may be modified without departing from the principles it is not intended to limit the invention to such matters except so far as set forth in the appended claims.

What is claimed is:

1. A pulverized fuel boiler furnace comprising a combustion chamber having a first or hot zone with uncooled refractory walls followed by a water cooled zone between the hot zone and the boiler and containing water passages, a water cooled floor comprising circulation tubes, and circulation connections leading water from the boiler to the water floor, thence from the water floor to the water passages of the cooled zone, and thence to the boiler.

2. A pulverized fuel furnace comprising the walls of the combustion chamber, a metallic water cooled floor beneath the combustion chamber, an ash supply pocket and an ash passage from the supply pocket to the chamber floor for conveying and depositing fuel ashes and applying them directly upon the floor to shield the same.

3. A furnace as in claim 2 and wherein the ash conveying means comprises an ash passage from an ash collecting pocket in the boiler to the floor and means as an ejector, controllable to accelerate the flow of ashes therein.

4. For the combustion of pulverized fuel in suspension in air, a furnace of the kind having a slag preventing bottom to the combustion chamber comprising water circulation tubes and presenting toward the radiant heat a substantially closed heat absorbing bottom surface arranged at an incline discharging to an ash outlet; in which furnace the water cooled bottom comprises oppositely inclined bottom portions discharging downwardly to a relatively narrow and continuously open discharge slot extending substantially from side to side of the combustion chamber, and with an exteriorly sealed ash chamber below such outlet receiving the un- slagged ashes, said ash chamber narrower than the combination chamber but wider than the discharge slot.

5. For the combustion of pulverized fuel in suspension in air, a furnace of the kind having a slag preventing bottom to the combustion chamber comprising water circulation tubes and presenting toward the radiant heat a substantially closed heat absorbing bottom surface arranged at a downward incline discharging to an ash outlet; in which furnace the water cooled bottom comprises oppositely inclined bottom portions discharging downwardly to a relatively narrow common outlet, and with an exteriorly sealed ash chamber below such outlet receiving the unslagged ashes, and the water tubes of the bottom being continued at both sides to extend downwardly into the outlet and receive radiant heat from the descending ashes.

6. For the combustion of pulverized fuel in suspension in air, a furnace of the kind having a slag preventing bottom to the combustion chamber comprising water circulation tubes and presenting toward the radiant heat a substantially closed heat absorbing bottom surface arranged at a downward incline discharging to an ash outlet; in which furnace the water cooled bottom comprises oppositely inclined bottom portions discharging downwardly to a relatively narrow common outlet, and with an exteriorly sealed ash chamber below such outlet receiving the unslagged ashes, and the water tubes of the bottom being continued to extend down through the outlet into the ash chamber to receive radiant heat from the ashes settling therein.

7. For the combustion of pulverized fuel in suspension in air, a furnace of the kind having a slag preventing bottom exposed to the radiant heat of combustion, said bottom comprising water circulation tubes for heat absorption and arranged at an incline to an ash outlet, and means to inject pulverized fuel and air above such bottom; in which furnace the water cooled bottom comprises oppositely inclined bottom portions discharging ashes downwardly at both sides to a relatively narrow and continuously open bottom outlet, and with an exteriorly sealed ash chamber below such outlet receiving the unslagged ashes, a movable gate adjustable in such bottom outlet to vary the width of the opening, and means for holding the adjustment.

8. For the combustion of pulverized fuel in suspension in air, a boiler or other furnace of the kind having a slag preventing bottom to the combustion chamber comprising water circulation tubes and presenting toward the radiant heat a substantially closed heat absorbing bottom surface arranged at an incline discharging to an ash outlet, and means for injecting pulverized fuel and air into the chamber; in which furnace the water cooled bottom comprises oppositely inclined water cooled bottom portions discharging unslagged ash downwardly to an open outlet slot extending across the chamber, and below such outlet an exteriorly sealed ash chamber provided with ash bridges dividing it into hopper shape subchambers, the top edges of the bridges being substantially lower than the combustion chamber bottom and the several pockets having separate dumping means.

In testimony whereof, I have affixed my signature hereto.

JAY GOULD COUTANT.